United States Patent
Song et al.

(10) Patent No.: US 10,336,952 B2
(45) Date of Patent: Jul. 2, 2019

(54) MIXING DEVICE FOR A DOWN-FLOW HYDROPROCESSING REACTOR

(71) Applicant: Chevron U.S.A. Inc., San Ramon, CA (US)

(72) Inventors: Steve Xugi Song, Albany, CA (US); Parimi Krishniah, Alamo, CA (US); Timothy D. Breig, Oakland, CA (US); Brett Michael Safford, El Sobrante, CA (US)

(73) Assignee: Chevron U.S.A. Inc., San Ramon ( * ) Notice: Subject to any disclaimer, the term of this patent is extended or adjusted under 35 U.S.C. 154(b) by 0 days.

(21) Appl. No.: 15/690,401

(22) Filed: Aug. 30, 2017

(65) Prior Publication Data

US 2018/0057757 A1 Mar. 1, 2018

Related U.S. Application Data

(60) Provisional application No. 62/382,728, filed on Sep. 1, 2016.

(51) Int. Cl.
| | |
|---|---|
| *C10G 47/00* | (2006.01) |
| *C10G 65/02* | (2006.01) |
| *B01F 3/04* | (2006.01) |
| *B01F 5/00* | (2006.01) |
| *B01J 8/04* | (2006.01) |
| *C10G 45/02* | (2006.01) |
| *C10G 45/32* | (2006.01) |
| *C10G 45/44* | (2006.01) |
| *C10G 45/58* | (2006.01) |
| *C10G 49/00* | (2006.01) |

(52) U.S. Cl.
CPC .......... *C10G 47/00* (2013.01); *B01F 3/04503* (2013.01); *B01F 5/0057* (2013.01); *B01J 8/0446* (2013.01); *B01J 8/0453* (2013.01); *B01J 8/0492* (2013.01); *C10G 45/02* (2013.01); *C10G 45/32* (2013.01); *C10G 45/44* (2013.01); *C10G 45/58* (2013.01); *C10G 49/002* (2013.01); *C10G 65/02* (2013.01); *B01F 2215/0036* (2013.01); *B01J 2208/00849* (2013.01); *B01J 2208/00929* (2013.01); *B01J 2208/00938* (2013.01); *B01J 2208/027* (2013.01)

(58) Field of Classification Search
CPC ...... C10G 47/00; C10G 49/002; C10G 65/02; C10G 45/02; C10G 45/32; C10G 45/44; C10G 45/582; B01J 8/0492; B01J 8/0453; B01J 8/0446; B01F 3/04503; B01F 5/0057
USPC ....................................................... 422/606
See application file for complete search history.

(56) References Cited

U.S. PATENT DOCUMENTS

| | | | |
|---|---|---|---|
| 3,480,407 A | * | 11/1969 | Anderson .............. B01J 8/0005 261/113 |
| 4,597,854 A | | 7/1986 | Penick |
| 5,152,967 A | | 10/1992 | Rosetti et al. |
| 5,690,896 A | | 11/1997 | Stangeland et al. |

(Continued)

*Primary Examiner* — Huy Tram Nguyen
(74) *Attorney, Agent, or Firm* — Mark L. Warzel (57) ABSTRACT

An improved vortex-type mixing device for a down-flow hydroprocessing reactor is described. The device provides improved overall mixing efficiency of an existing mixing volume in the mixing of gas and liquid phases in two-phase systems while reducing the pressure drop through the device, as compared with prior art devices. Typical hydroprocessing applications include hydrotreating, hydrofinishing, hydrocracking and hydrodewaxing.

18 Claims, 8 Drawing Sheets

(56) References Cited

U.S. PATENT DOCUMENTS

| | | |
|---|---|---|
| 5,904,907 A | 5/1999 | Shih |
| 5,989,502 A | 11/1999 | Nelson et al. |
| 6,098,965 A | 8/2000 | Jacobs et al. |
| 6,183,702 B1 | 2/2001 | Nguyen et al. |
| 6,881,387 B1 | 4/2005 | Jacobs et al. |
| 7,045,103 B2 | 6/2006 | McDougald et al. |
| 8,017,095 B2 | 9/2011 | Kemoun et al. |
| 9,079,141 B2 * | 7/2015 | Boyak ................ B01F 3/04113 |
| 2003/0146525 A1 | 8/2003 | Jacobs et al. |
| 2004/0037759 A1 | 2/2004 | Van Vliet et al. |
| 2005/0163682 A1 | 7/2005 | Jacobs et al. |
| 2013/0064740 A1 | 3/2013 | Boyak et al. |
| 2014/0231308 A1 | 8/2014 | Muller |

* cited by examiner

FIG. 4 ALT

MIXING DEVICE FOR A DOWN-FLOW HYDROPROCESSING REACTOR

FIELD OF THE INVENTION

An improved vortex-type mixing device for a down-flow hydroprocessing reactor is disclosed. Such down-flow hydroprocessing reactors are used in the petroleum and chemical processing industries for carrying out catalytic reactions of hydrocarbonaceous feedstocks in the presence of hydrogen, at an elevated temperature and pressure. Suitable hydroprocessing applications include hydrotreating, hydrofinishing, hydrocracking and hydrodewaxing.

BACKGROUND OF THE INVENTION

In fixed-bed hydroprocessing reactors, gas and liquid reactants (e.g. hydrogen and a hydrocarbonaceous feedstock) flow downward through one or more beds of solid catalyst. (See, e.g. U.S. Pat. No. 4,597,854 to Penick).

As the reactants flow downward through the reactor catalyst beds, the reactants contact the catalyst materials and react to produce the desired products. Gas reactants such as hydrogen are consumed, and heat is generated by the catalytic reactions. Controlling the temperature of the feedstock as it travels downward through the reactor is important to ensure the quality and quantity of product yield is maximized toward the target product(s).

Cool hydrogen-rich gas can be introduced between the catalyst beds to quench the temperature rise and replenish the hydrogen consumed by the reactions. In order to maintain overall reactor performance, the temperature of the fluids within the reactor should be as uniform as possible and liquids and gases should be well mixed in order to maximize performance. Poor interbed fluid mixing can limit reactor operation in various ways. When interbed mixing is unable to erase the radial temperature differences, these differences persist or grow as the process fluids move down the reactor. Hot spots in any bed can lead to rapid deactivation of the catalyst in that region which shortens the total reactor cycle length. Product selectivities are typically poorer at high temperatures. For example, hot regions can cause color, viscosity and other product qualities to be off-specification. Also, if the temperature at any point exceeds a certain value (typically 800 to 850° F.), the exothermic reactions may become self-accelerating leading to a runaway event, which can damage the catalyst, the vessel, or downstream equipment.

Due to these hazards, refiners operating with poor reactor internal hardware must sacrifice yield and/or throughput to avoid the deleterious effects of poor interbed fluid mixing. Reactor temperature maldistribution and hot spots can be minimized through mixing and equilibration of reactants between catalyst beds, correcting any temperature and flow maldistributions, and minimizing pressure drops. The mixing of fluids between catalyst beds can be accomplished through the use of distributer assemblies and mixing chambers. With present-day refinery economics dictating that hydroprocessing units operate at feed rates far exceeding design, optimum interbed fluid mixing is a valuable low-cost debottleneck.

Distributor assemblies can be used to collect, mix, and distribute fluids in the interbed region of multi-bed catalyst reactors. Distributor assemblies generally include a trough for collecting and mixing liquid and gas flowing from an overhead catalyst bed, and a mixing device or chamber disposed centrally within the trough for receiving liquid from the trough and further mixing the liquid and gas.

The mixing device is a key component of many distributor assemblies because it provides efficient and thorough mixing of fluids/gases and helps avoid hot spots and poor temperature distribution.

The mixing device has at least one inlet for receiving liquid from the trough and at least one outlet for directing flow toward an underlying catalyst bed. Designs for mixing devices vary, including baffle mixer designs such as ribbon blenders and disk-and-donut type mixers that promote mixing through changing the direction of the fluid and gases.

Another type of mixer is a centrifugal or vortex-type design. This type of mixer collects the liquid and gas streams flowing downward through the reactor, and introduces them into a circular chamber where they make several rotations before being passed downward through a centrally located aperture.

If present, the mixing device is generally located in the interbed space between catalyst beds in a reactor. The interbed space in many reactors is limited due to the presence of support beams, piping, and other obstructions which occupy the interbed region. Due to these space constraints, unique hardware, such as a mixing device scaled to fit the space available, is required to perform efficient two-phase mixing in what amounts to limited volume. In addition, lower height distributor assemblies can increase catalyst loading volume with the same reactor volume, therefore improve utilization of the reactor volume.

Various types of mixing devices are described in a number of patents; see, e.g., US Pat. Publ. No. 2014/0231308. The present invention provides certain improvements over prior art vortex-type mixing devices, such as those described in U.S. Pat. Nos. 9,079,141 and 8,017,095.

Due to the importance of sufficient interbed fluid mixing for good catalyst lifetimes, high throughput, long cycle length, and overall reactor performance, improved mixing devices are needed. A continuing need exists for mixing devices having reduced vertical footprint and reduced pressure drop through the device, while still allowing for retrofit installation in existing reactors having limited interbed space.

SUMMARY OF THE INVENTION

The present invention is directed to a vortex-type mixing device for a down-flow hydroprocessing reactor. The mixing device provides a more effective mixing of fluids in the space between catalyst beds in a multi-bed reactor. The mixing device provides effective mixing of an existing mixing volume in mixing the gas and liquid phases of two-phase systems, while providing for a reduced pressure drop through the, mixing device as compared with other voltex-type mixing devices. The device is well suited for retrofit applications due to its relatively small size and can also be scaled for new reactor designs to achieve efficient fluid mixing in the interbed space of a multi-bed reactor. In conjunction with additional mixing and distribution components of a multi-bed downflow reactor, including, e.g., flow nozzles, the mixing device provides effective mixing of the liquid and gas phases as well as mixing of the gas and liquid phases together.

The mixing device includes a top plate having an inner surface and a base plate extending parallel to the top plate. The base plate has an inner surface and a base plate aperture. Both the top and base plates have a periphery defining the outer edge of each plate. A plurality of inwardly-directed vanes extend perpendicular to and interposed between the inner surfaces of the top and base plates, the top and base plates being separated so that an interior region is present between the plates to accommodate the vanes and reactor fluid. The vanes are inwardly-directed from the periphery of the top and base plates toward the base plate aperture and are spaced around the area extending from the base plate aperture to the periphery of the top and base plates. The mixing device includes a mixing region, which generally extends from the base plate aperture to the inlet region of the mixing device, where the inlet region lies between neighboring vanes. In contrast to certain prior art devices, e.g., U.S. Pat. No. 9,079,141, the mixing device of the invention does not include a weir ring extending from the inner surface of the base plate or a bubble cap extending from the inner surface of the top plate.

The invention is also directed to a multi-bed down-flow catalytic reactor, comprising an upper and a lower catalyst bed contained in a reactor shell having an inner surface, an interbed distribution assembly interposed between the upper and lower catalyst beds, the interbed distribution assembly comprising a mixing device according to the invention.

BRIEF DESCRIPTION OF THE DRAWINGS

FIGS. 1-7 provide representative views of a mixing device according to the invention. The scope of the invention is not limited by these representative figures and is to be understood to be defined by the claims of the application.

FIG. 4 ALT is an alternate top plan view of the mixing device of the invention showing optional holes in the top plate.

DETAILED DESCRIPTION

The vortex-type mixing device of the present invention affords benefits over vortex-type mixing devices known in the art. Such benefits include, a reduced vertical footprint in the reactor (reduction in reactor volume occupied by inter bed distributor assemblies), high throughput, enhanced mixing, lower pressure drop, and enhanced overall reactor performance. Specific embodiments and benefits are apparent from the detailed description provided herein. It should be understood, however, that the detailed description, figures, and any specific examples, while indicating beneficial embodiments, including some that are preferred, are intended for purposes of illustration only and are not intended to limit the scope of the invention.

Figure 1:
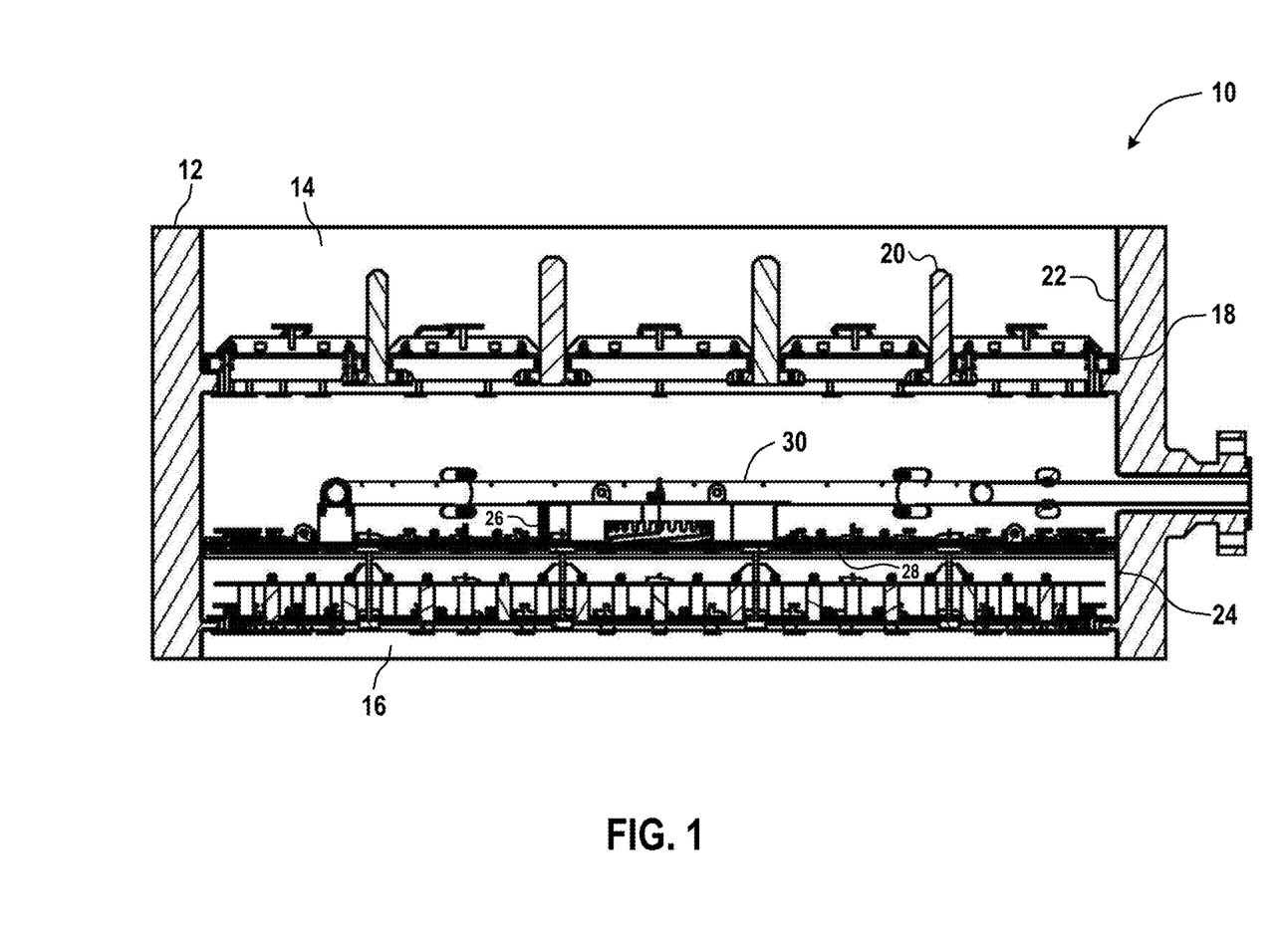
FIG. 1 is a schematic view of an embodiment of the mixing device of the invention situated within a multi bed catalytic reactor.

The invention is directed to a vortex-type mixing device for a multi-bed hydroprocessing reactor. A cross-sectional view of a portion of a multi-bed down-flow reactor 10 is illustrated in FIG. 1. The reactor 10 includes a vessel shell 12, upper and lower catalyst beds (14 and 16, respectively) containing packed catalytic extrudates. Each catalyst bed 14, 16 is supported on a grid screen assembly 18 (illustrated for catalyst bed 14 only) composed of a support grid, optional space cloth and screen, all of which are well known in the art. The grid screen assembly is mounted on parallel support beams 20 that are horizontally mounted to the reactor vessel inner wall 22, and extend upwardly into the catalyst bed 14.

An interbed distribution assembly 24 is vertically interposed between the catalyst beds 14, 16. The interbed distribution assembly 24 includes a vortex-type mixing device 26 of the invention. The mixing device 26 is mounted under the catalyst bed 14, and in fluid tight communication with a collection plate 28 adapted to receive and mix liquid and gas flowing down from the overhead catalyst bed. A quench gas inlet tube 30 distributes quench gas (e.g., hydrogen) into the region above the mixing device 26.

Figure 2:
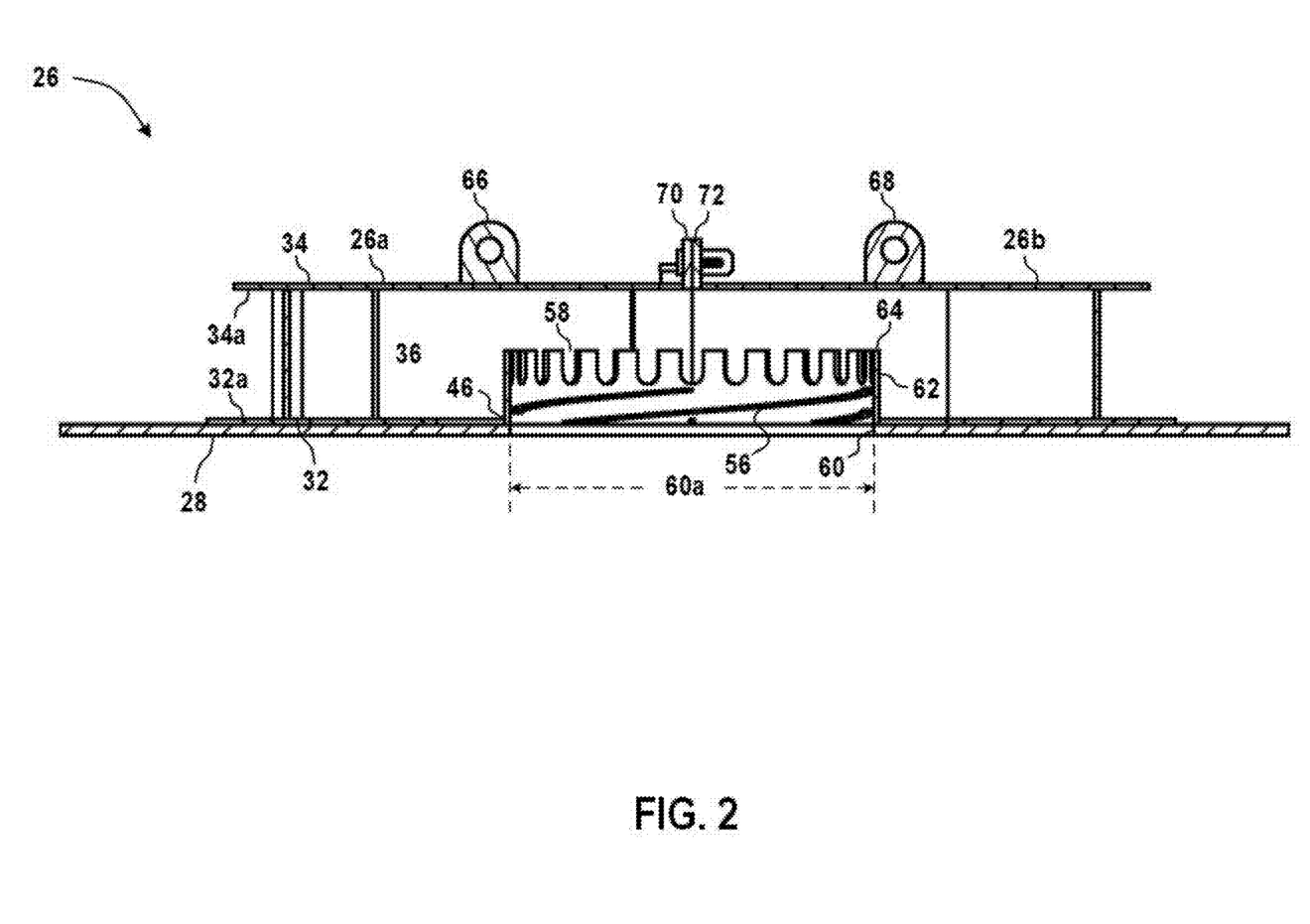
FIG. 2 is a cross-sectional view of the mixing device of the invention.
Figure 3:
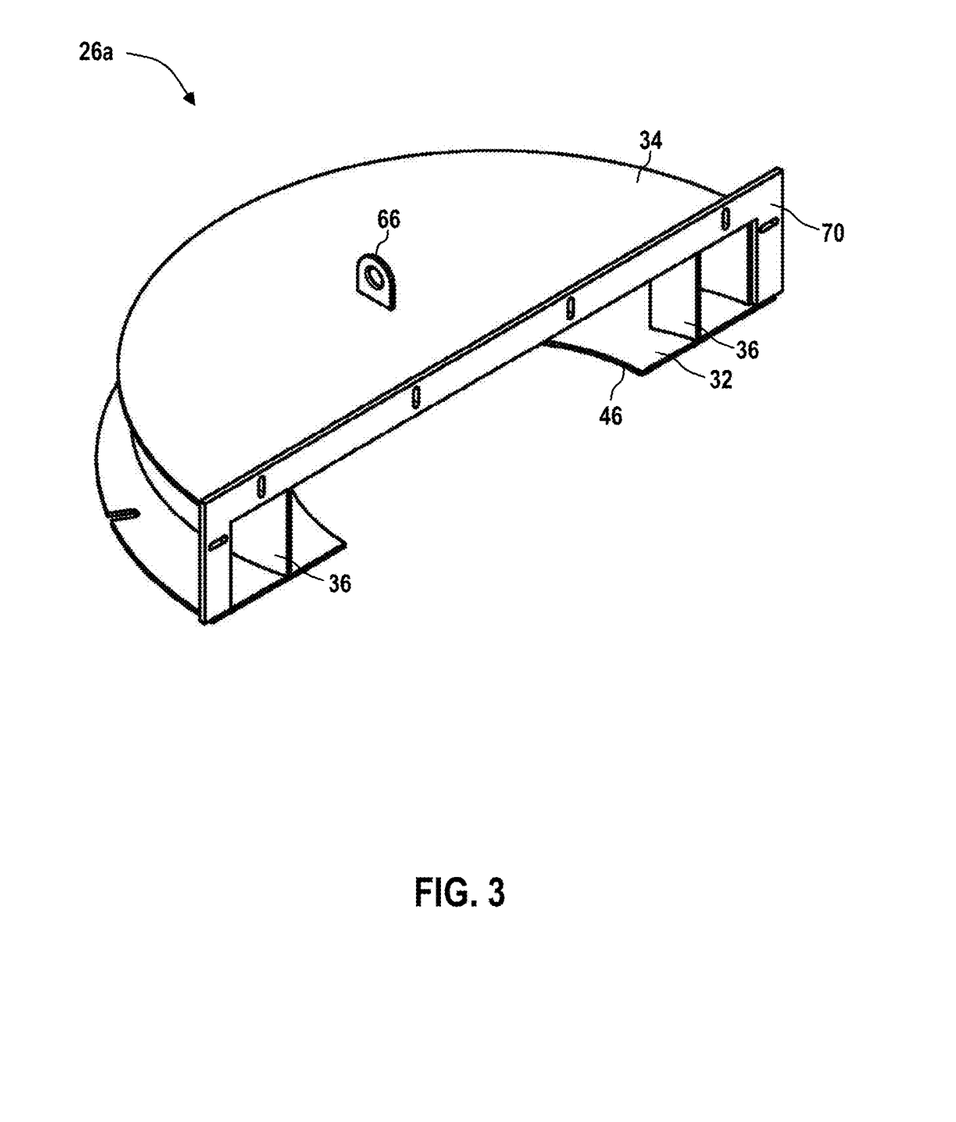
FIG. 3 is an isometric view of one half of the mixing device 26 of the invention.
Figure 4:
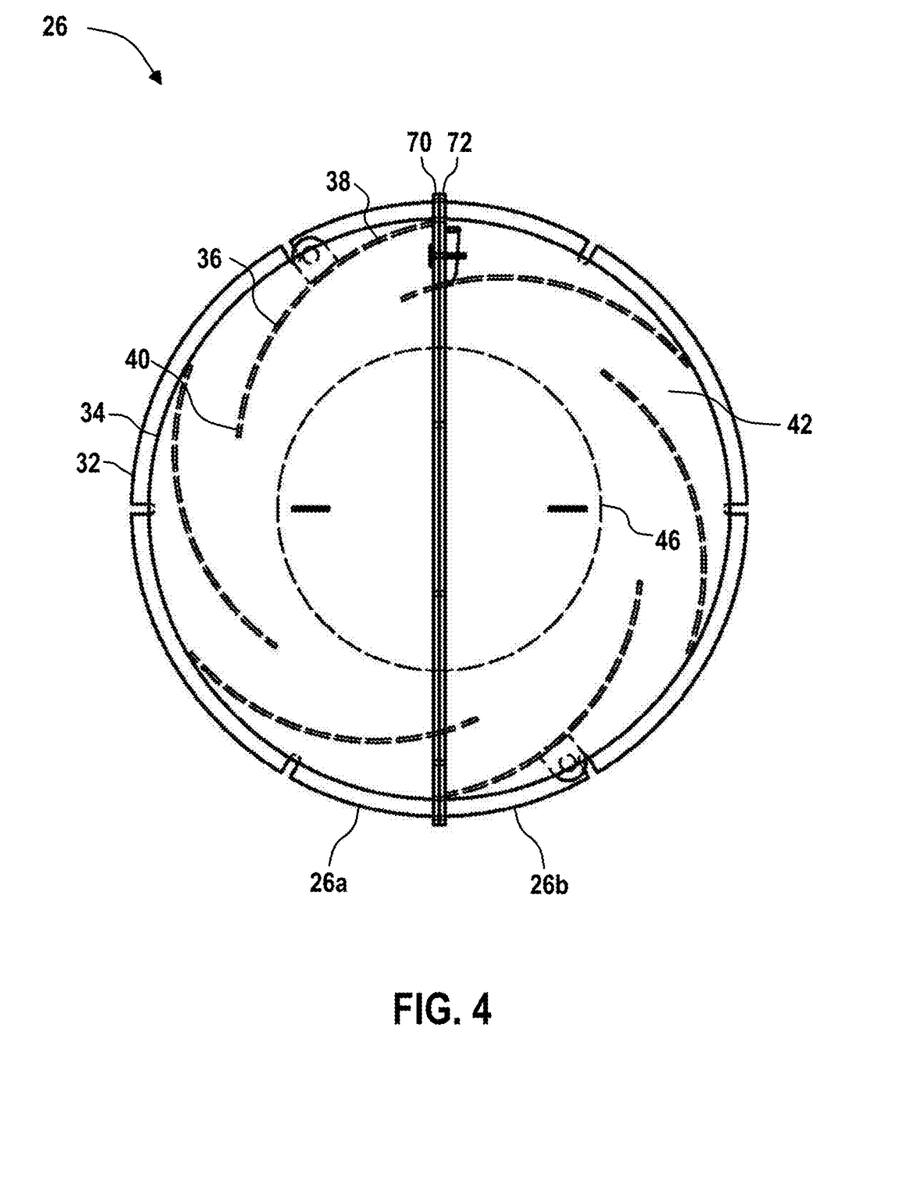
FIG. 4 is a top plan view of the mixing device.

FIG. 2 is a cross-sectional view of the mixing device 26, FIG. 3 is an isometric view of one half of the mixing device 26, i.e., section 26a, and FIG. 4 is a top plan view of the mixing device 26. FIG. 4 ALT shows an alternate top place view of the mixing device showing holes 74 in and distributed around the top plate.

The mixing device includes a base plate 32 having an inner surface 32a and mounted in fluid tight communication with the collection plate 28 (FIG. 1), and a top plate 34 having a top plate inner surface 34a which extends substantially horizontally relative to the base plate 32. The top plate may alternatively contain holes 74 in the plate distributed around the top of the mixing device to allow entry of gas, as shown in FIG. 4 ALT. The collection plate 28 collects fluids flowing down from the overlying catalyst bed.

A plurality of staggered, inwardly-directed, or more specifically inwardly-curved vanes 36 are fixedly attached to, and extend perpendicularly between the base and top plate inner surfaces 32a and 34a, respectively. The vanes 36 are preferably in fluid tight communication with the base and top plate inner surfaces 32a and 34a, respectively. The number of vanes is typically from 3-8, preferably from 4-6. As shown in FIG. 4 and 4 ALT, the number of vanes may be 6, with the vanes distributed around the area extending from the periphery of the base plate to the base plate aperture 46. The vanes may be straight or curved and are preferably inwardly-curved (FIG. 4).

As shown in FIG. 4, each vane has a vane outer end 38 affixed proximal to the periphery of the top plate 34, and interior end 40 located proximal to a mixing region (described herein below) of the mixing device 26. The open space between the vanes 36 define a series of mixing device inlet regions 42, each inlet region 42 being defined as area bound by neighboring vanes 36 and their respective interior and outer ends 38 and 40.

Figure 6:
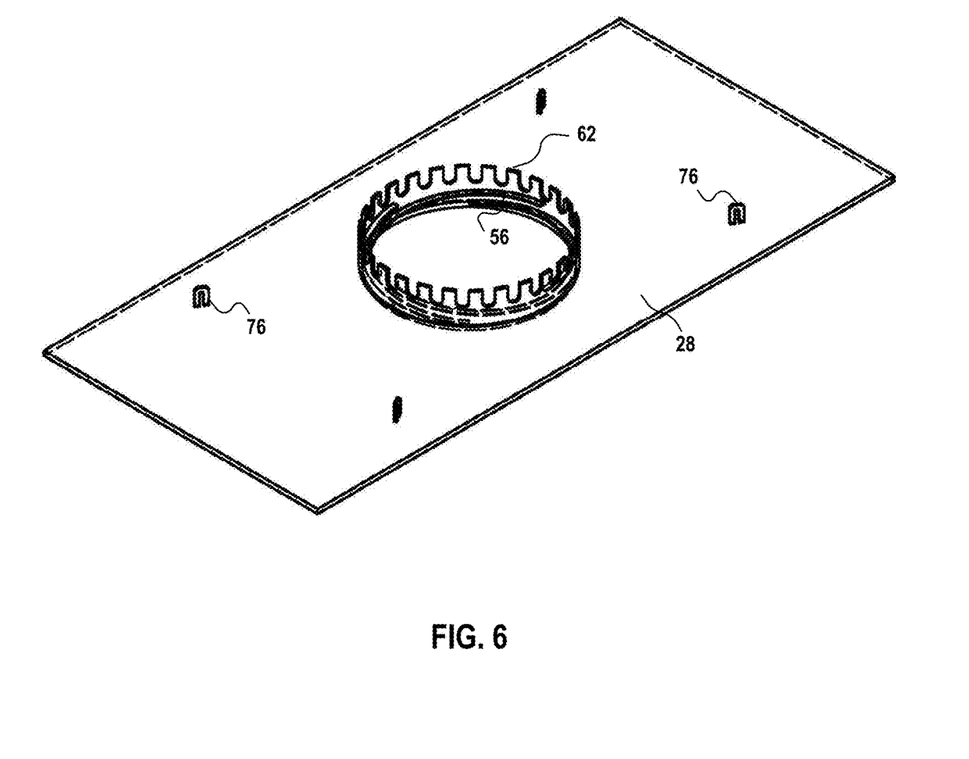
FIG. 6 is an isometric view of the collection plate showing the positioning of a slotted riser according to the invention.
Figure 7:
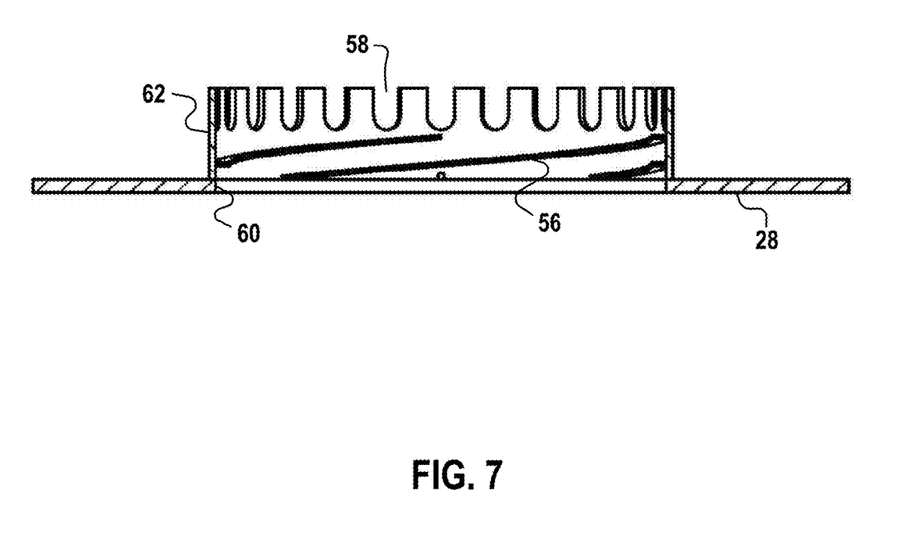
FIG. 7 is a cross-sectional view of a portion of the collection plate showing the riser detail.

The collection plate 28 includes an aperture defined by edge 60, and a riser 62 proximal to the collection plate aperture 60 that extends away from the collection plate 28 and into the mixing region. The riser 62 has a top edge 64 and is situated within the mixing region. The height of the riser is typically from 25-75% of the distance between the top plate and the base plate. As shown in FIG. 6, the collection plate aperture and the riser may be circular, with the riser being referred to as a riser tube. The riser typically contains slots 58 in the top edge spaced around the periphery of the top edge of the riser (FIGS. 2 and 7). The collection plate aperture 60 each has a diameter 60a (FIG. 2).

In operation, hydrocarbonaceous liquid feed rains down from the catalyst bed 14, through the grid screen assembly 18, and onto the annular collection plate 28. Gas from the upper catalyst bed 14 mixed with quench gas (e.g., hydrogen gas) introduced via the quench gas inlet tube 30 fills the void between the liquid collected on the collection plate 28 and the catalyst bed 14.

The liquid and gas enter the mixing device 26 via the mixing device inlet regions 42, wherein the vanes 36 tangentially direct the liquid and gas to flow in an arcuate or circular flow pattern as the liquid and gas enter the mixing region of the mixing device 26. The liquid and gas flow up and over the riser tube top end 64 and into the riser tube 62. The gas and liquid intermix to a degree and flow downward out of the riser tube 62, typically to a tray containing a plurality of perforations, downcomers or nozzles, and then on to the lower catalyst bed 16. The inner surface of the riser 62 typically contains perforated spiral plates to further improve gas/liquid mixing while flowing downward in the riser 62.

The mixing device 26 as described herein is intended for use in a large hydroprocessing reactor designed to process thousands or tens-of-thousands of barrels of feedstock per day (1 barrel=43 gal.; 164 L). Typically, the mixing device 26 may be several feet in diameter and, because of the materials used to construct the device 26 (e.g., ¼"-½" plate steel), weigh several hundred pounds (lbs) when constructed.

The mixing device 26 of the invention may be constructed in place by welding or otherwise affixing the individual components together to achieve construction of the finished device 26. Constructing the device 26 in place using this method may take several days, delaying operation of the reactor unit. In cases where the device 26 is being employed to update or retrofit the design of an existing reactor, it is desirable to reduce the amount of assembly taking place within the reactor vessel (due to safety concerns such as possibly igniting residual hydrocarbon materials remaining in the reactor).

In order to reduce the amount of time needed to construct a new reactor, or retrofit an existing reactor, portions of the mixing device 26 are preferably pre-assembled to form subassemblies, and the subassemblies are inserted into the reactor and assembled to form the completed mixing device 26.

In one embodiment illustrated in FIGS. 2, 3 and 4, the mixing device 26 is formed from two mixing device subassemblies 26a, 26b, each representing one-half of the mixing device 26. Each subassembly 26a, 26b is provided with one or more lifting lugs 66 and 68, respectively. The lifting lugs 66, 68 are provided for attaching each subassembly 26a, 26b to a hoist, crane or other device capable of lowering the subassembly into the reactor and maneuvering the subassembly into place.

Each subassembly 26a, 26b is provided with a mating flange 70 and 72, respectively, containing a plurality of openings through which a nut/bolt combination (or such other appropriate affixing device) can be inserted to hold the subassemblies 26a, 26b in place during operationS 26a, 26b may be disassembled between operating periods during maintenance to allow access to the areas above and below the mixing device 26. The mixing device 26 may be attached to the collection plate by aligning perimeter slots in the base plate 32 with attachment points on the collection plate 76.

Figure 5:
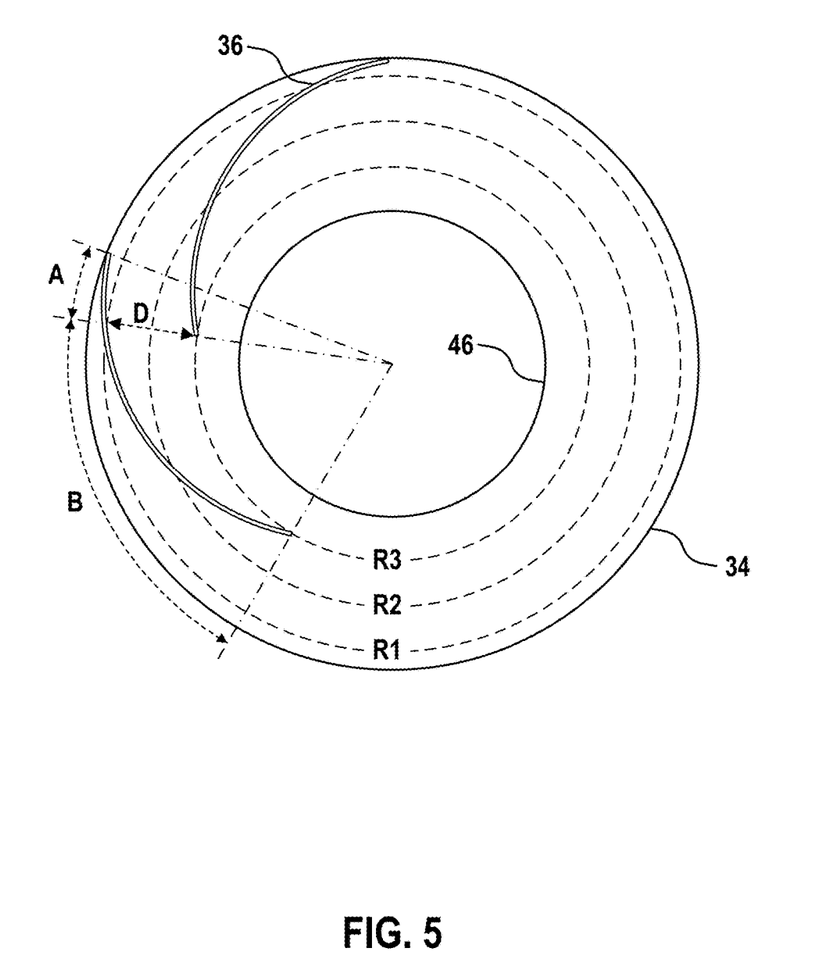
FIG. 5 is a top plan view illustrating the layout of inwardly-curving vanes of the invention.

The placement of the inwardly-curved vanes 36 is illustrated in FIG. 5. Circle R1, representing the outer diameter of the mixing device 26, as prescribed by process hydraulic calculations employed by those skilled in the art, along with circle R3, representing the inner diameter of the mixing device inlet regions 42, also prescribed by process hydraulic calculations, are illustrated. Circle R2 is located half the radial distance between R1 and R3.

Angle "A" of FIG. 5 represents the angular offset of the outer end of one vane with the interior end of a neighboring vane, which results in a radial "overlap" of a vane interior end 40 with a larger portion of a neighboring vane outer end 38 (see FIG. 4). While not necessarily limited to specific values, suitable angle A values may be 15° for a 4 vane system, 10° for a 6 vane system, and 8° for a 8 vane system. Angle "B" represents the radial distance the vane 36 occupies within the region between R1 and R3. Representative non-limiting values for angle B are 360°/(the number of vanes). At angle "A", the inner surface of the vane 36 intersects with R1. At an angle that is the sum of angles "A" and "B" (A+B), the inner surface of the vane 36 intersects with R3. At an angle that equals A+B/2, the inner surface of the vane 36 intersects with R2.

The distance "D" between neighboring vanes at the overlap region (i.e., the distance R1-R3 in FIG. 5) may be varied to define the inlet region 42 (FIGS. 4 and 5). In one aspect of the invention, the distance "D" is greater than prior art vortex-type mixing devices, specifically as described in U.S. Pat. No. 9,079,141. Preferably, "D" is at least about 5%, more preferably at least about 10% greater than such prior art devices.

The foregoing description of an embodiment of the invention is primarily for illustrative purposes, it being recognized that a number of variations might be used which would still incorporate the essence of the invention. Reference should be made to the following claims in determining the scope of the invention.

What is claimed is:

1. A mixing device for a multi-bed down-flow catalytic reactor, the mixing device comprising:
   a. a top plate having an inner surface and a periphery;
   b. a base plate extending parallel to the top plate, the base plate having an inner surface, a periphery, and a base plate aperture, wherein the top and base plates are separated by a distance to define an interior region of the mixing device;
   c. a plurality of inwardly-directed vanes contained within the interior region of the mixing device extending perpendicular to and interposed between the inner surfaces of the top and base plates, wherein the vanes are inwardly-directed from the periphery of the top and base plates toward the base plate aperture and are spaced around the area extending from the base plate aperture to the periphery of the top and base plates; and
   d. a mixing region;
   wherein, the mixing device does not include a weir ring extending from the inner surface of the base plate or a bubble cap extending from the inner surface of the top plate.

2. The mixing device of claim 1, wherein the base plate aperture is circular.

3. The mixing device of claim 1, wherein the vanes are straight or curved.

4. The mixing device of claim 3, wherein the vanes are inwardly-curved.

5. The mixing device of claim 1, wherein each vane comprises an outer end proximal to the periphery of the top plate and an interior end proximal to the mixing region, the mixing device further comprising a plurality of inlet regions defined as an area bound by neighboring vanes and the corresponding interior end and outer end of the respective vanes.

6. The mixing device of claim 5, wherein the mixing region is defined as an area between the top and base plates, excluding the areas defining the inlet regions.

7. The mixing device of claim 5, wherein the interior end of each vane radially overlaps with the outer end of a neighboring vane.

8. The mixing device of claim 1, wherein the base plate aperture is a single opening centrally located in the base plate.

9. The mixing device of claim 1, wherein the device provides two-phase mixing of gas and liquid.

10. A multi-bed down-flow catalytic reactor, comprising:
an upper and a lower catalyst bed contained in a reactor shell having an inner surface;
an interbed distribution assembly interposed between the upper and lower catalyst beds;
the interbed distribution assembly comprising a mixing device according to claim 1 affixed above and in fluid tight communication with a collection plate having a collection plate aperture and a riser extending from the collection plate proximal to the collection plate aperture, wherein the riser extends through the base plate aperture and into the mixing region of the mixing device.

11. The reactor of claim 10, wherein the base plate aperture, the collection plate aperture, and the riser are each circular, the base plate aperture diameter being larger than the riser diameter.

12. The reactor of claim 10, wherein the vanes are straight or curved.

13. The reactor of claim 12, wherein the vanes are inwardly-curved.

14. The reactor of claim 10, wherein each vane of the mixing device comprises an outer end proximal to the periphery of the top plate and an interior end proximal to the mixing region, the mixing device further comprising a plurality of inlet regions defined as an area bound by neighboring vanes and the corresponding interior end and outer end of the respective vanes.

15. The reactor of claim 14, wherein the mixing device mixing region is defined as an area between the top and base plates, excluding the areas defining the inlet regions.

16. The reactor of claim 14, wherein the interior end of each vane radially overlaps with the outer end of a neighboring vane.

17. The reactor of claim 10, wherein the riser does not extend through the top plate.

18. A process for the two-phase mixing of gas and liquid in a down-flow catalytic reactor, comprising providing gas and liquid to the mixing device of claim 1 contained within the reactor.

* * * * *